US006975992B2

(12) United States Patent
Tucker et al.

(10) Patent No.: US 6,975,992 B2
(45) Date of Patent: Dec. 13, 2005

(54) METHOD FOR WATERMARKING DATA

(75) Inventors: Roger Cecil Ferry Tucker, Chepstow (GB); Paul St John Brittan, Claverham (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 600 days.

(21) Appl. No.: 10/201,958

(22) Filed: Jul. 25, 2002

(65) Prior Publication Data

US 2003/0028381 A1 Feb. 6, 2003

(30) Foreign Application Priority Data

Jul. 31, 2001 (GB) .................................... 0118661

(51) Int. Cl.[7] ......................... G10L 21/00; G06K 9/00; H04L 9/00

(52) U.S. Cl. ....................... 704/273; 382/100; 713/200

(58) Field of Search ................................ 704/270, 273; 713/176; 382/100, 233

(56) References Cited

U.S. PATENT DOCUMENTS

| | | | | |
|---|---|---|---|---|
| 5,319,735 | A | 6/1994 | Preuss et al. | |
| 5,774,452 | A | 6/1998 | Wolosewicz | |
| 5,889,868 | A * | 3/1999 | Moskowitz et al. | 713/176 |
| 6,122,403 | A * | 9/2000 | Rhoads | 382/233 |
| 6,233,347 | B1 * | 5/2001 | Chen et al. | 382/100 |
| 6,272,634 | B1 * | 8/2001 | Tewfik et al. | 713/176 |
| 6,381,341 | B1 * | 4/2002 | Rhoads | 382/100 |
| 6,396,937 | B2 * | 5/2002 | Chen et al. | 382/100 |
| 6,400,826 | B1 * | 6/2002 | Chen et al. | 382/100 |
| 6,522,767 | B1 * | 2/2003 | Moskowitz et al. | 382/100 |
| 6,674,876 | B1 * | 1/2004 | Hannigan et al. | 382/100 |
| 6,792,542 | B1 * | 9/2004 | Lee et al. | 713/200 |

FOREIGN PATENT DOCUMENTS

| | | | |
|---|---|---|---|
| GB | 2 343 818 | A | 5/2000 |
| GB | 2 365 295 | A | 2/2002 |
| WO | 97/26733 | | 7/1997 |
| WO | 99/60792 | | 11/1999 |
| WO | 00/30291 | | 5/2000 |

OTHER PUBLICATIONS

Schulz, Donald, "Improving Audio Codecs by Noise Substitution," J. Audio Eng. Socl, vol. 44, No. 7/8, Jul./Aug. 1996, pp. 593-598, no date.

Levine, Scott N., et al., "A Sines + Transients + Noise Audio Representation for Data Compression and Time/Pitch Scale Modifications," Center for Computer Research in Music and Acoustics, Stanford University, Stanford, CA, presented at 105th AES Convention, Sep. 26-29, 1998.

(Continued)

*Primary Examiner*—Susan McFadden

(57) ABSTRACT

A method for inserting a watermark into an audio signal comprising substituting a noise-like signal portion with a replacement noise-like signal portion, and the replacement noise-like signal portion is modulated with watermark data. In a preferred embodiment Perceptual Noise Substitution is used to locate those portions of the audio signal which are noise-like and which may be replaced by synthetic noise modulated with watermark data. Advantageously the inventive method results in a signal having a synthetic noise signal portion which is modulated by watermark data but which is perceived merely as a noisy signal portion and not as watermark data carrying. Furthermore, watermarks incorporated by the inventive method may be adapted to be robust to various audio compression schemes.

35 Claims, 4 Drawing Sheets

OTHER PUBLICATIONS

Tucker, Roger C.F., "Low Bit-Rate Frequency Extension Coding," Hewlett Packard Laboratories, Filton Road, Stoke Gifford, Bristol, UK, no date.

Bender, W., et al., "Techniques for data hiding," IBM Systems Journal, vol. 35, Nos. 3 & 4, 1996, pp. 313-336, no month/date.

Tilki, John F. et al., "Encoding a Hidden Digital Signature onto an Audio Signal Using Psychoacoustic Masking," Bradley Department of Electrical Engineering, Virginia Tech, Blacksburg, VA, no date.

Swanson, Mitchell D., et al., "Robust audio watermarking using perceptual masking," Signal Processing 66 (1998) 337-355, no month/date.

Sweene, P., Error Control. Coding (An Introduction), "1. The Principles of Coding," pp. 1-15, Prentice-Hall International Ltd., Englewood Cliffs, NJ, 1991, no month.

Sweene, P., Error Control. Coding (An Introduction), "10. Selection of a Coding Scheme," pp. 185-195, Prentice-Hall International Ltd., Englewood Cliffs, NJ, 1991, no month.

* cited by examiner

METHOD FOR WATERMARKING DATA

FIELD OF THE INVENTION

The present invention relates to a method for watermarking data, and in particular, but not exclusively to watermarking an audio signal.

BACKGROUND TO THE INVENTION

The process of embedding data in digitised media—audio, video or images—is often referred to as digital watermarking. Unlike the paper watermarking it is named after, a key requirement is that the digital watermark should be completely imperceptible. Other requirements depend on the application:

A fragile watermark is used to show that the media has not been tampered with in any way, and should be affected whenever anything is done to the media, in particular editing of any kind.

A robust watermark is mainly used to prove ownership or copyright & should not be removable no matter what is done to the media, including compression, writing to tape, editing or any other manipulation which retains the main value of the media.

Robust watermarking uses a combination of error correction coding as for example discussed by P. Sweene, "Error Control Coding (An Introduction)", Prentice-Hall International Ltd., Englewood Cliffs, N.J. (1991), spread-spectrum modulation see for example R. Preuss, S. Roukos, A. Higgins, H. Gish, M. Bergamo, P. Peterson, "Embedded Signalling", U.S. Pat. No. 5,319,735, 1994, and perceptual modelling eg M. Swanson, B. Zhu, A. Tewfik, L. Boney, "Robust Audio Watermarking Using perceptual Masking, Signal Processing," vol. 66, no. 3, May 1998, pp. 337–355, to hide the watermark data in a way that is least perceptible but still recoverable.

A problem with perceptual modelling is that compression schemes use the same model to decide which parts of the signal do not need to be reproduced in the decoded audio. Thus the very part of the signal where the data is hidden is the same part likely to be removed by compression. However, even after compression, some of the watermark tends to remain, and the robustness introduced through spread-spectrum and error coding allows it be recovered as long as the embedded data bit-rate is low.

Some known watermarking schemes substitute part of an audio signal with a watermark signal. Examples of such schemes are given in U.S. Pat. No. 5,774,452 and by J F Tilki and A A Beex in "Encoding a Hidden Digital Signature onto an Audio Signal using Psychoacoustic Masking", (in Proc 1996, $7^{th}$ Int Conf. on Sig. Proc. Apps. and Tech., pp 476–480). Because the substituted signal is quite different, they rely on psychoacoustic masking to minimise the perceptual effect of the substitution. If it were possible to substitute a signal which is perceptually equivalent to the original audio, there would be no need to rely on psychoacoustic masking, and the signal would not be in danger of being removed by compression schemes like MP3 (MPEG Audio Layer 3, as set out in "Information technology-coding of moving pictures and associated audio for digital storage media up to about 1.5 Mbit/s—Part 3. Audio", ISO/IEC 11172-3: 1993). W Bender, D Gruhl, N Morimoto and A Lu in "Techniques for data hiding" IBM Systems Journal, Vol. 35, Nos. 3 & 4, pp 313–336, propose just such an idea for image watermarking, a technique known as Texture Block Encoding. A human selects two areas of an image where the texture is similar, and a small amount of the first area is then copied into the second area—the shape of this copied data defines the watermark and in the above referenced paper by Bender et al, is a few letters of text. The technique suffers from the need for a human to both select the areas and assess the visual impact after watermarking, and is not suitable for automated watermarking.

A number of recent audio compression techniques search for parts of the signal that can be characterised by random noise, and substitute pseudo-random noise for these parts of the signal when decoding. R C F Tucker in "Low Bit-Rate Frequency Extension Coding" (Audio and music technology: the challenge of creative DSP, IEE Colloquium, 18 Nov. 1998, pp 3/1–3/5) observes that the high frequency parts of an audio signal can successfully be replaced by spectrally-shaped noise for medium-quality compression. Scott Levine and Julius O Smith III in "A Sines+Transients+Noise Audio Representation for Data Compression and Time/Pitch-Scale Modifications" ($105^{th}$ Audio Engineering Society Convention, San Francisco 1998) uses noise more carefully, separating out the transients from the steady-state noise and using transform coding on the transients. A more general scheme proposed by D Schultz in "Improving Audio Codecs by Noise Substitution" (JAudio Eng. Soc., Vol 44, No 178, July/August 1998, pp 593–596), the contents of which is hereby incorporated by reference, searches all time-frequency segments above 5 kHz and uses synthetic noise to reproduce only those segments which have strong noise-like properties.

We have realised that a signal portion which has an attribute which is perceived to be non-information carrying, for example noise in an audio signal, can be replaced by a signal portion which has an attribute which is also perceived as being non-information carrying but which is modulated with watermark data. In particular we have realised that it would be advantageous to substitute a portion of a signal having a substantially random attribute for a replacement signal portion which also has a substantially random attribute which has been modulated with watermark data. In one embodiment of the present invention the compression scheme suggested by D Schultz is utilised by modulating the synthetic noise with watermark data.

SUMMARIES OF THE INVENTION

According to a first aspect of the invention there is provided a method of incorporating a watermark into a signal, comprising substituting a replaceable signal portion of the signal which has a substantially random attribute with a replacement signal portion, the replacement signal portion having a substantially random attribute which has been modulated by watermark data.

A watermark so incorporated is advantageously substantially imperceptible as a result of replacing a signal portion having a substantially random attribute with another signal portion also having a substantially random attribute.

An attribute of a signal portion may be the general nature of the signal portion or alternatively may be a particular parameter of the signal portion.

The method preferably comprises analysing an audio signal above a predetermined frequency for replaceable signal portions which are of a substantially random nature.

The method may comprise analysing the audio signal for replaceable signal portions of a substantially random nature above 5 kHz.

Preferably the method comprises analysing the audio signal in a predetermined frequency band for replaceable signal portions which are of a substantially random nature.

Most preferably the predetermined frequency band is 5 kHz to 11 kHz.

The replacement signal portion may comprise a signal generated by a random signal generator in accordance with a predetermined key.

Preferably an instantaneous signal level value of the replacement signal portion is modulated in response to a respective instantaneous value of the watermark data.

Preferably where the watermark data comprises a first binary value and a second binary value, the first binary value results in a respective instantaneous signal level value of the replacement signal portion being multiplied by unity and the second binary value results in a respective instantaneous signal level value being inverted about a predetermined value of signal level.

The watermark data may be incorporated into the signal as a plurality of discrete replacement signal portions making the watermark data more difficult to locate.

One bit of watermark data may advantageously be distributed over two discrete replacement signal portions.

The discrete replacement signal portions are preferably temporally spaced.

The discrete replacement signal portions may be spaced in the frequency domain.

A first replacement signal portion for a first portion of watermark data may be generated by a random signal generator in accordance with a first key, and a second replacement signal portion for a second portion of watermark data may be generated by a random signal generator in accordance with a second key.

When the signal is an audio signal the signal may be divided into a plurality of time-frequency frames. Audio components within each frame are preferably analysed to determine a measure of the randomness of the signal produced by the components.

The method may comprise incorporating a synchronisation sequence signal portion into the signal, the synchronisation sequence signal portion being generated by a random signal generator in accordance with a key, and the location of incorporation of the synchronisation sequence signal portion in the signal being indicative of the location of incorporation of a replacement signal portion in the signal.

The method may in addition comprise incorporating a header signal portion into the signal, the header signal portion comprising a signal portion generated by a random signal generator which is modulated by data which is representative of the frequency band in which the replacement signal portion is located.

The replaceable signal portion may comprise a portion of an audio signal generated by a random signal generator in an audio synthesiser.

The audio synthesiser may comprise a music synthesiser.

The replaceable signal portion may comprise a portion of a speech signal.

According to a second aspect of the invention there is provided a computer readable medium having stored therein instructions for causing a processing unit to execute the method in accordance with the first aspect of the invention.

By 'computer readable medium' we mean a medium which is capable of storing instructions for a processing unit. The term 'processing unit' shall be taken to mean a device which accepts an input and processes that input in accordance with predetermined instructions to produce an output.

According to a third aspect of the invention there is provided an encoder which is configured to perform the method in accordance with the first aspect of the invention.

According to a fourth aspect of the invention there is provided a method of reading a signal which is provided with a watermark, comprising locating a replacement signal portion and identifying the presence of the watermark in said replacement signal portion, the replacement signal portion having a substantially random attribute which has been modulated by watermark data, the replacement signal portion having replaced a replaceable signal portion which has a substantially random attribute.

The method may be a method of reading an audio signal which is provided with a watermark.

Preferably the method comprises searching frequency bands for a recognisable synchronisation sequence signal portion.

The reading method desirably comprises locating a synchronisation sequence signal portion by comparing the audio signal to an output produced by a random signal generator in accordance with a key, the location of the synchronisation sequence signal portion being indicative of the location of the watermark data in the audio signal.

The method may comprise demodulating the replacement signal portion by correlating an output produced by a random signal generator in accordance with a known key with the replacement signal portion.

When the signal is an audio signal the step of locating a replacement signal portion desirably comprises dividing the audio signal into a plurality of time-frequency frames, and analysing audio components in each frame to determine a measure of the randomness of the signal produced by the components.

According to a fifth aspect of the invention there is provided a computer readable medium having stored therein instructions for causing a processing unit to execute the method in accordance with the third aspect of the invention.

According to a sixth aspect of the invention there is provided an encoder comprising a signal analyser, a random signal generator and a modulator, the arrangement being such that in use the signal analyser analyses a signal so as to determine a replaceable signal portion which has a substantially random attribute, the modulator being operative to modulate a replacement signal portion generated by the random signal generator with watermark data, and the replaceable signal portion being substituted by the replacement signal portion.

According to a seventh aspect of the invention there is provided a reader comprising a signal analyser, a random signal generator and a demodulator, the arrangement being such that in use the signal analyser analyses a signal in order to determine the presence of a watermark in the signal, the watermark being incorporated into the signal by way of a replacement signal and the replacement signal portion having a substantially random attribute which has been modulated by watermark data.

DETAILED DESCRIPTION OF THE DRAWINGS

Figure 1:
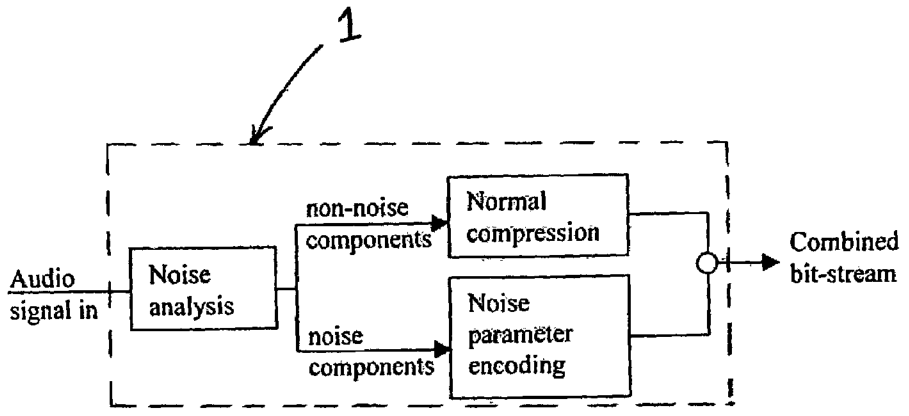
FIGURE 1 (PRIOR ART)
FIG. 1 is a block diagram of a known audio signal compression process.
Figure 2:
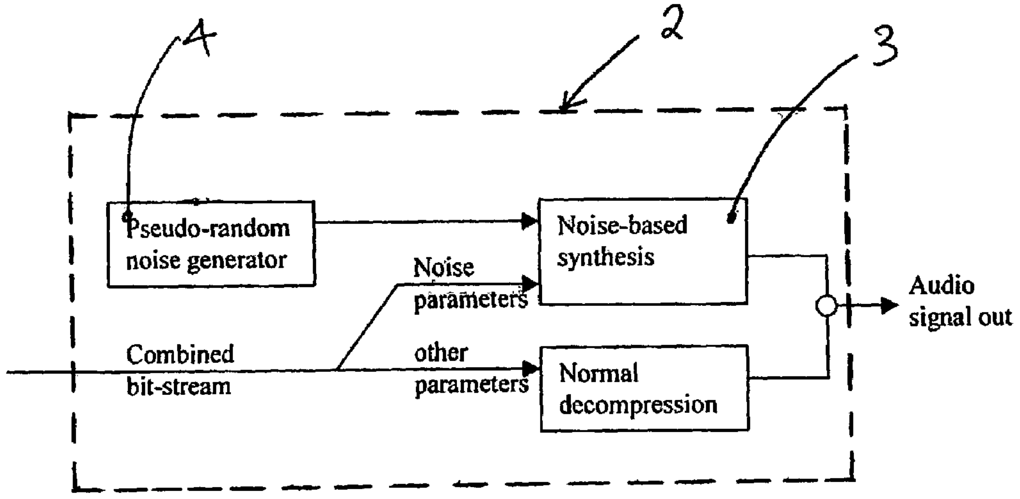
FIGURE 2 (PRIOR ART)
FIG. 2 is a block diagram of a known audio signal decompression process for decompressing a signal processed in accordance with FIG. 1.

Various embodiments of the invention will now be described, by way of example only, with reference to the accompanying drawings. With reference to FIGS. 1 and 2 there is shown schematically a method of compressing an audio signal as set out in the aforementioned reference by D Schulz, known as Perceptual Noise Substitution (PNS).

More specifically FIG. 1 shows an audio signal being input into a data compression unit 1. The audio signal undergoes noise analysis whereby time-frequency frames of the signal are analysed so as to determine which of those frames are substantially noise-like, ie where the signal can be considered to be of a substantially random nature. Subsequently, those signal components which cannot be considered to be sufficiently noise-like are compressed in a conventional manner, whereas those components of the audio signal which have been determined to be substantially random in nature are then sent to an encoder. The encoder generates data to indicate the broad frequency characteristic and energy of the components considered to be noise-like. Thus there is produced bit-stream comprising data representing compressed non-noise-like signal components and data relating to the noise-like components. Such a method of compression results in a reduced bandwidth signal compared to one in which both noise and non-noise-like components are conventionally compressed.

Turning to FIG. 2, in order to regain the audio signal the combined bit stream is decompressed as follows. The combined bit stream is transmitted to a data decompression unit 2. The data representing the non-noise-like components is decompressed in a conventional manner. The data representing the noise-like components is fed to a synthesiser 3. The synthesiser 3 is operative to accept a signal from a pseudo-random noise generator 4 and in response to the data representing the noise-like components a noise signal is inserted into the audio signal where the original noise-like components were.

The following embodiment of the present invention comprises a combination of the above method carried by the compression unit 3 and the decompression unit 14 to incorporate watermark data into an audio signal as will be described below with reference initially to FIG. 3.

An audio signal which is to be watermarked is transmitted to watermarking apparatus 20. The audio signal is first subjected to a noise analyser unit 5 in order to determine which time-frequency portions of the audio signal are to be considered as noise-like, ie have a substantially random nature when taken in isolation. The signal is divided into thirty-two frequency bands within the audible range of frequencies. Time-frequency sub-frames are created then by sub-sampling each band and then dividing the bands into groups of 12 samples representing approximately 10 ms of audio.

Each frame is then analysed to determine which of them is sufficiently noise-like to be replaced by a 'synthetic' noise signal portion. Each time-frequency frame is given a score to indicate a measure of how noise-like the elements within that frame are. The score can be calculated from the normalised prediction error as described by Schulz in the aforementioned reference.

Having determined which frames are sufficiently noise-like, the step of noise parameter extraction comprises generating data, the noise parameters, which are representative of the energy of the frames which have been considered to be sufficiently noise-like. The noise parameters then undergo the step of noise-based synthesis, which is now described.

A pseudo-random noise generator 8 is operative to generate an audio noise signal in accordance with a known key. The output of the noise generator 8 provides an input to a modulator 7 which in addition accepts an input of a watermark data signal which is preferably error-protected. Where the watermark data is represented by a binary system, an error-protection scheme may comprise adding a '1' or a '0' to a string of digits depending on whether the string of digits consists of an even number or an odd number of '1' digits respectively. Error-protection allows some deterioration in the signal, and also so that data cannot be erroneously extracted from real noise.

The modulator 7 is operative to modulate the signal level of the pseudo-random noise in accordance with the watermark data. More specifically an instantaneous amplitude value of the signal generated by the noise generator is either multiplied by unity or inverted about a predetermined signal level value depending on whether the respective instantaneous value of the watermark data is '1' or '0'. Thus for example if a generated noise component of 30 corresponds to an instantaneous value of the watermark data of '1', when inverted would result in a modulated value of −30.

The result of such modulation is that a noise-like replacement signal portion is produced, notwithstanding the modulation, which is of a substantially random nature.

Figure 4:
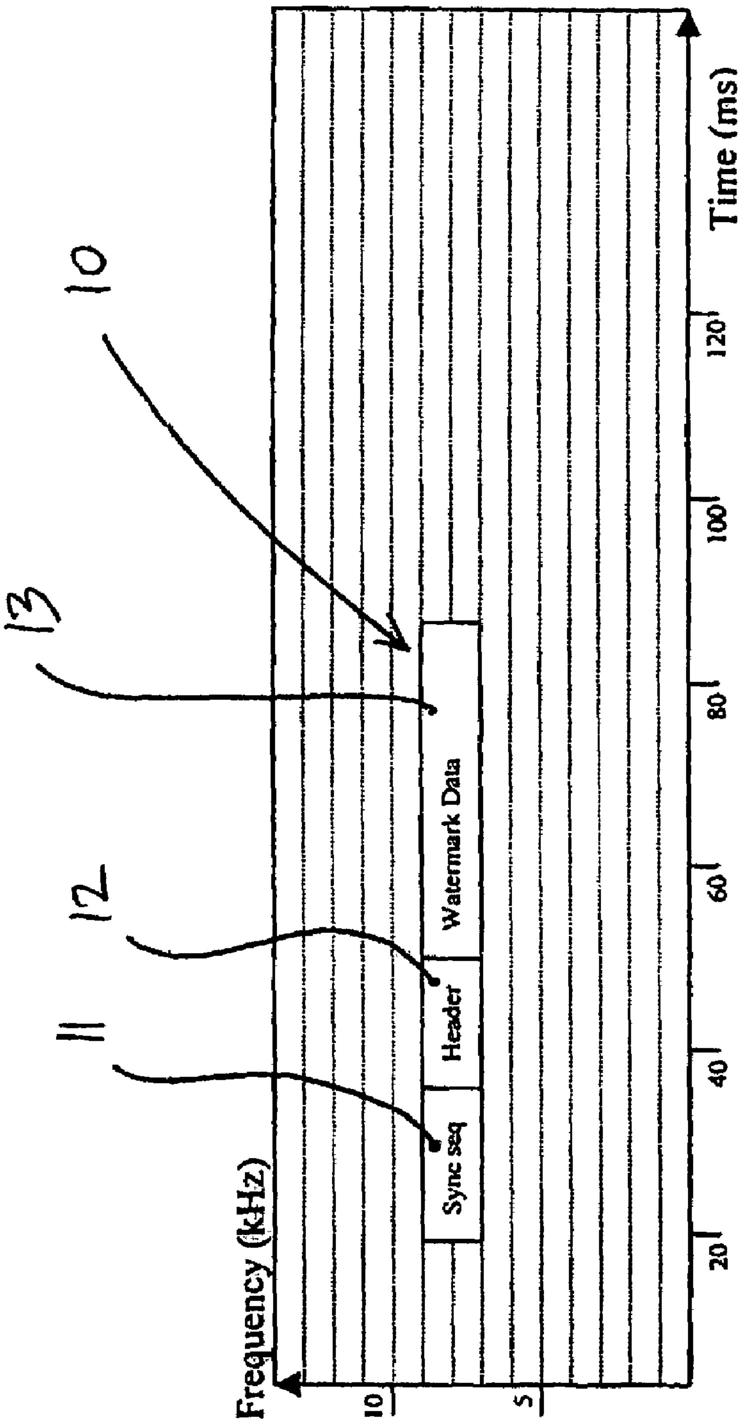
FIG. 4 is a schematic time frequency plot showing a watermark data packet.

FIG. 4 shows a time-frequency plot in which there is shown a watermark data packet 10 comprising three signal sub-packets which are substantially contiguous in time and which has been embedded into an audio signal (not illustrated) into where it has been determined that a noise-like portion in the original audio signal can be replaced by a synthetically generated modulated noise signal. The three signal sub-packets shown represent a synchronisation sequence 11, header information 12 and watermark data 13. The shorter the combined packet 10 the more the overhead of the synchronisation sequence, but the shorter (and therefore more likely to occur) the noise-like portion needed to place it.

As already stated a first step of the inventive method in this embodiment is to locate portions of the original signal which may be replaced by synthetically generated noise signal portions. A synchronisation sequence which is incorporated into the audio signal acts as a flag which allows a watermark packet to be located. The synchronisation sequence is generated by the output of the noise generator with a known key so that its signature may be recognised.

The synchronisation sequence achieves three purposes:

1. it allows the exact start time of the data to be pinpointed
2. it allows any time, frequency or spectral distortions in the audio to be measured and compensated for in a normalisation process
3. it allows a further normalisation process to calculate the original noise parameters exactly, since the framing can be exactly the same as that used for the calculations conducted during insertion of the watermark data.

The normalisation process can therefore recover the original modulated noise signal, apart from distortions caused by any compression that may have taken place.

The header contains usual information such as packet length, and may also contain information relating to the exact frequency band in the audio signal of the watermark data. The header and data sections are generated by modulating the information onto the output from the noise generator 8 in a known key.

Although FIG. 4 shows the watermark data as being provided in a single packet, this need not necessarily be the case. It may be that due to the limited length of the locations in the audio signal where a substitute noise signal portion may be inserted, the watermark data needs to be distributed over a plurality of discrete watermark data packets which are separated by portions of the original audio signal. However even if it is not necessary to incorporate the watermark data in such a way it would nevertheless be advantageous to distribute the watermark data over a plurality of discrete time-frequency packets. Thus for example one bit of the watermark data could be copied over at least two discrete watermark data packets so that advantageously increased robustness is achieved.

Where the watermark data is dispersed over a plurality of discrete data packets, a different key (in a known sequence) may be used to start the pseudo-random noise generator for each packet to avoid using the same key twice and risking detection by autocorrelation.

The replacement signal portion should preferably be given short-term spectral colour or energy variations that makes it difficult to be detected by noise analysis, but which is not perceptible. This exploits the necessarily conservative decision-making of any noise analysis system (as in that suggested by Schulz) which has to be careful not to make the substitution when there appear to be tonal components present. For a given noise analysis scheme, such as might be employed in a future MPEG4 audio encoder, the noise should be altered just enough to stop it being detected whilst retaining its perception as noise.

By placing the watermark packet in only a few of the possible substitution places in the original audio signal, and giving the watermark properties that make it harder to detect, any attempt to remove it will force the threshold at which substitution occurs to be lowered, and in doing so the audio will be corrupted through making a lot of inappropriate noise substitutions.

Another possible way to ensure high robustness would be to adjust the properties of the generated noise signal according to the masking effect of the signal energy just beneath the noise band. The greater the energy of this signal, the more the masking effect and the less noise-like the replacement signal can be. U.S. Pat. No. 5,774,452 uses this masking effect to hide frequency shift keying (FSK) data in the upper frequencies of the audio signal.

The process of reading watermark data provided in an audio signal is now described.

Figure 5:
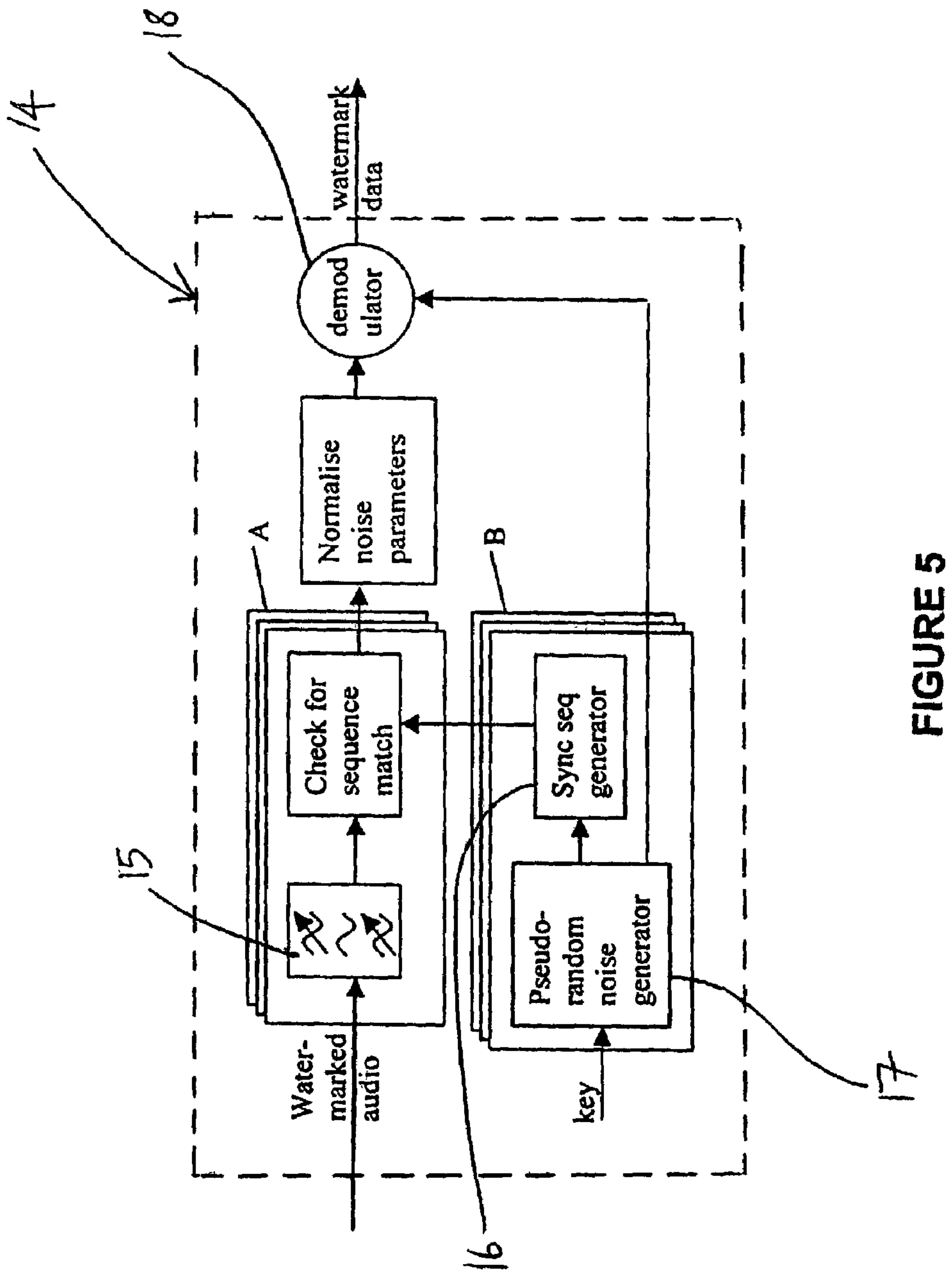
FIG. 5 is a block diagram illustrating a watermark reader for reading watermark data from an audio signal.

FIG. 5 shows a watermark reader 14. The reader has stored in associated storage device the key or set of keys used by the random-noise generator 8, and from these can construct the synchronisation sequences found at the start of each packet—in FIG. 5 blocks B represent an additional step which will be needed for each key. If the reader 14 does not know the exact frequency band where the watermark packet has been placed because it was selected according to the original audio signal, it must estimate the possible locations in the same way as the watermark encoder 3 did. Alternatively it could simply search all possible frequency bands until a synchronisation sequence is found, as shown schematically by blocks A in FIG. 5 which represent the requirement for a search for each frequency band. The headers 12 would contain the exact frequency band information, so that once any packet has been read, the exact frequency band to search for other packets is known by the reader.

The demodulator 18 is operative to compare the replacement signal portion which is modulated by watermark data, with a signal produced by the random noise generator in accordance with the same key which generated the replacement signal portion before modulation.

The reader 14 searches a selected frequency band for a synchronisation sequence by approximately normalising the energy and spectrum of the audio in that band and then correlating with a local copy (i.e. which is known by the reader) of the synchronisation sequence 11. This correlation could take place in a conventional manner in the time domain or could be in the same transform domain as the watermark data is encoded for extra robustness to compression.

Once a positive correlation is found, demodulation of the located watermark data packet can begin.

Demodulation is achieved by generating a random noise signal in accordance with the key which was used to generate the random noise signal which was modulated with watermark data during encoding. The demodulator 18 is operative to compare the normalised watermark packet with the random noise signal and hence infer the watermark data. The water mark data so derived can then be checked against the watermark data which was encoded initially.

Figure 3:
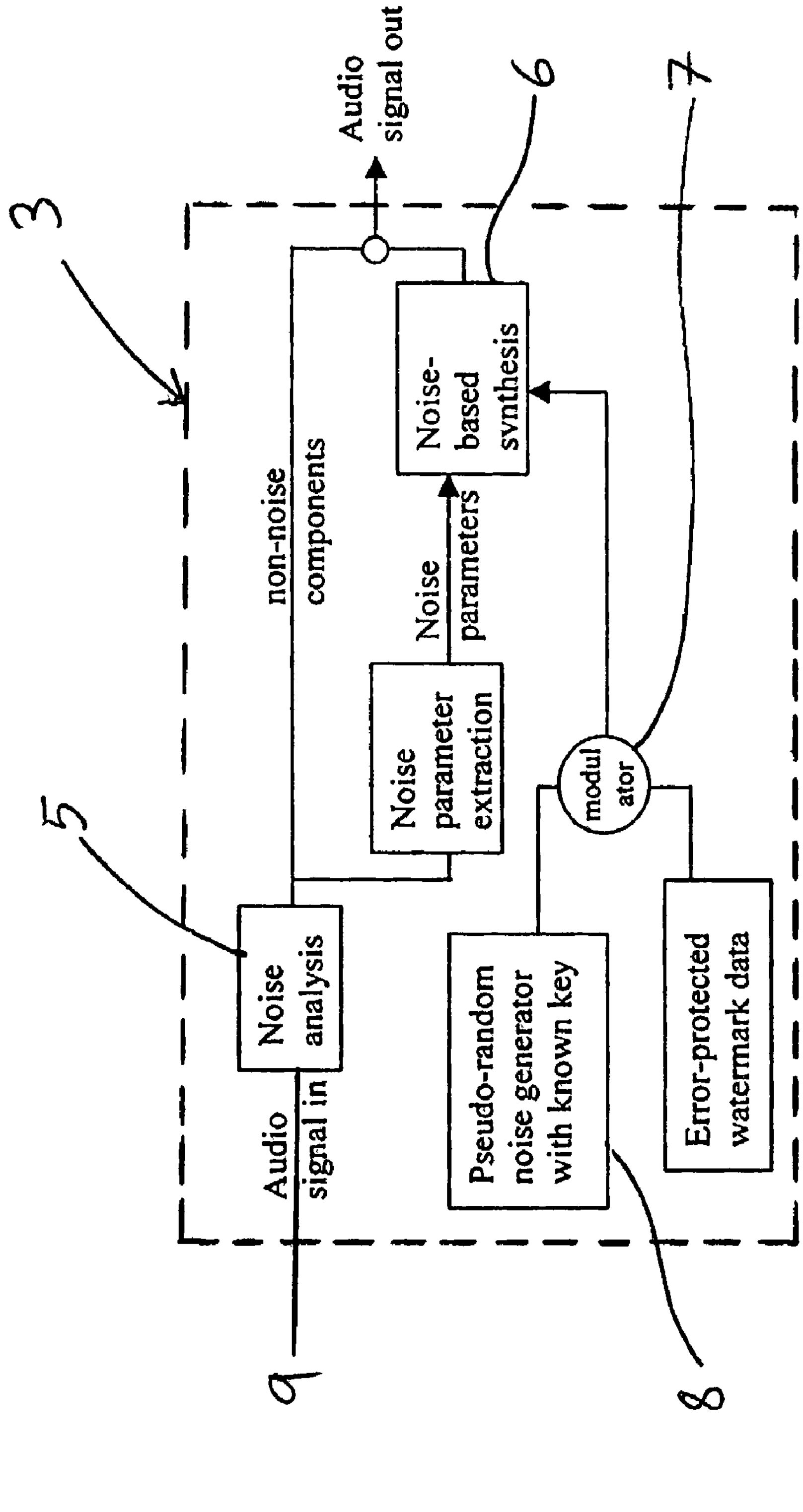
FIG. 3 is a block diagram of an encoder which incorporates watermark data into an audio signal in accordance with the invention.

It will be appreciated that although the encoder 3 and the reader 14 are shown schematically in FIGS. 3 and 5 respectively as comprising various physical modules or units such as a noise generator 8 and a modulator 7, the steps which are conducted during the encoding and reading processes are carried out in one preferred embodiment by a computer comprising a processing unit and associated data storage.

Many known watermark schemes mix the watermark signal with the audio at a much lower, and therefore inaudible, signal level. Between this approach, which works on all types of audio, and complete substitution of the audio by the watermark, which works only for noise-like audio, there is the possibility of mixing the watermark data at an audible signal level where the signal is somewhat but not completely noise-like. This approach would provide a fallback when the noise analysis fails to find enough segments in the original audio signal that can be completely substituted by noise to embed a watermark. The level at which the watermark signal is mixed would depend on the score from the noise analysis.

Detection of watermark data embedded in such a combined way would work in the same way as described above, but the synchronisation sequence would need to be longer and the data bit rate of the watermark data lower, as sinusoidal components would interfere with the detection process.

The inventive method need not necessarily be implemented using noise substitution and two other possible implementations are now discussed.

Where parts of audio are generated by musical synthesis, eg a drum machine, synthesiser or sequencer, any random process in the synthesis can be exploited to carry watermark data. Clearly any noise-like synthetic signal can be used as described above, but many other opportunities exist. For instance, since timings of audio components produced by a background sequencer are usually randomly varied to give a less machine-like rhythm this variation constitutes a substantially random attribute, and the exact timings can be varied to encode a few bits of data per note. Thus a signal portion comprising two such components can be considered to be a replaceable signal portion, the temporal spacing of such components being capable of being modulated by watermark data to produce a replacement signal portion.

To illustrate how a random process other than noise might be exploited in audio, the varying timings in speech signals could be used to give a low data rate scheme. Speech contains pauses, not just between words but also smaller pauses as part of sounds known as 'stops'—t,k,g,d,b,p in English. The precise timings of these pauses are perceived as being a substantially random attribute and accordingly a signal portion comprising such a pause can be considered to be a replaceable signal portion. By passing a signal representing the speech through a short buffer, these pauses can be modulated by a small amount according to the watermark data to be embedded to produce replacement signal portions. As the timings will be reproduced exactly by any compression scheme, the watermark will be robust to the particularly severe compression often applied to speech signals. For example, the speech signals may be part of a recording of a speech or may be produced by a digital voice synthesiser.

Robustness to deliberate attack by re-varying the pauses would require the pauses to be disguised with some signal that is inconsequential to the human listener but will fool a pause detector.

What is claimed is:

1. A method of incorporating a watermark into a signal, comprising substituting a replaceable signal portion of the signal which has a substantially random attribute with a replacement signal, the replacement signal portion having a substantially random attribute which has been modulated by watermark data.

2. A method as claimed in claim 1 which is a method of incorporating a watermark into an audio signal.

3. A method as claimed in claim 2 which comprises analysing the audio signal above a predetermined frequency for replaceable signal portions which are of a substantially random nature.

4. A method as claimed in claim 3 which comprises analysing the audio signal for replaceable signal portions of a substantially random nature above 5 kHz.

5. A method as claimed in claim 2 which comprises analysing the audio signal in a predetermined frequency band for replaceable signal portions which are of a substantially random nature.

6. A method as claimed in claim 5 in which the predetermined frequency band is about 5 kHz to 11 kHz.

7. A method as claimed in claim 2 in which the replacement signal portion comprises a signal generated by a random signal generator in accordance with a predetermined key.

8. A method as claimed in claim 7 in which an instantaneous signal level value of the replacement signal portion is modulated in response to a respective instantaneous value of the watermark data.

9. A method as claimed in claim 8 in which the watermark data comprises a first binary value and a second binary value, the first binary value resulting in a respective instantaneous signal level value of the replacement signal portion being multiplied by unity and the second binary value resulting in a respective instantaneous signal level value being inverted about a predetermined value of signal level.

10. A method as claimed in claim 2 in which the audio signal is divided into a plurality of time-frequency frames.

11. A method as claimed in claim 10 in which audio components within each frame are analysed to determine a measure of the randomness of the signal produced by the components.

12. A method as claimed in claim 1 in which the watermark data are incorporated into the signal as a plurality of discrete replacement signal portions.

13. A method as claimed in claim 12 in which the discrete signal portions are spaced in a frequency domain.

14. A method as claimed in claim 1 in which a first replacement signal portion for a first portion of watermark data is generated by a random signal generator in accordance with a first key and a second replacement signal portion for a second portion of watermark data is generated by a random signal generator in accordance with a second key.

15. A method as claimed in claim 12 in which one bit of watermark data are distributed over two discrete replacement signal portions.

16. A method as claimed in claim 12 in which the discrete replacement signal portions are temporally spaced.

17. A method as claimed in claim 1 which comprises incorporating a synchronisation sequence signal portion into the signal, the synchronisation sequence signal portion being generated by a random signal generator in accordance with a key, and the location of incorporation of the synchronisation sequence signal portion in the signal being indicative of the location of a replacement signal portion in the signal.

18. A method as claimed in claim 1 which comprises incorporating a header signal portion into the signal, the header signal portion comprising a signal portion generated by a random signal generator which is modulated by data which is representative of a frequency band in which the replacement signal portion is located.

19. A method as claimed in claim 1 in which the replaceable signal portion comprises audio components generated by a random signal generator in an audio synthesiser.

20. A method as claimed in claim 19 in which timings of at least some of the audio components generated by the random signal generator are modulated in accordance with watermark data.

21. A method as claimed in claim 20 in which the audio synthesiser comprises a music synthesiser.

22. A method as claimed in claim 1 in which the replaceable signal portion comprises a portion of a speech signal.

23. A method as claimed in claim 22 which comprises modulating pauses in the speech signal in accordance with watermark data.

24. A computer readable medium having stored therein instructions for causing a processing unit to execute the method of claim 1.

25. An encoder which is configured to perform the method as claimed in claim 1.

26. A method of reading a signal which is provided with a watermark, comprising locating a replacement signal portion (10) and identifying the presence of the watermark in said replacement portion, the replacement signal portion having a substantially random attribute which has been modulated by watermark data, the replacement signal portion having replaced a replaceable signal portion which has a substantially random attribute.

27. A method as claimed in claim 26 which is a method of reading an audio signal which is provided with a watermark.

28. A method as claimed in claim 27 which comprises searching frequency bands for a recognisable synchronisation sequence signal portion.

29. A method as claimed in claim 28 in which a synchronisation sequence signal portion is located by comparing the audio signal to an output produced by a random signal generator in accordance with a key, the location of the synchronisation sequence signal portion being indicative of the location of the watermark data in the audio signal.

30. A method as claimed in claim 26 which comprises demodulating the replacement signal portion by correlating an output produced by a random signal generator in accordance with a known key with the replacement signal portion.

31. A method as claimed in claim 27 in which the process of locating a replacement signal portion comprises dividing the audio signal into a plurality of time-frequency frames, and analysing audio components in each frame to determine a measure of the randomness of the signal produced by the components.

32. A computer readable medium having stored therein instructions for causing a processing unit to execute the method of claim 26.

33. An encoder comprising a signal analyser, a random signal generator and a modulator, the signal analyser, random signal generator and modulator being arranged such that in use: (a) the signal analyser analyses a signal so as to determine a replaceable signal portion which has a substantially random attribute, (b) the modulator modulates a replacement signal portion generated by the random signal generator with watermark data, and (c) the replaceable signal portion is substituted by the replacement signal portion.

34. A reader comprising a signal analyser, a random signal generator and a demodulator, the signal analyser, random signal generator and modulator being arranged such that in use: (a) the signal analyser analyses a signal in order to determine the presence of a watermark in the signal, (b) the watermark is incorporated into the signal by way of a replacement signal portion and (c) the replacement signal portion has a substantially random attribute which has been modulated by watermark data.

35. A circuit for watermarking an input signal having a random component, the circuit comprising:

a detector for the random component and a watermark source for deriving a watermark; and a combiner arrangement, including the detector, connected to be responsive to the input signal and the derived watermark for modifying the input signal so the detected random component thereof is replaced by the watermark.

* * * * *